UNITED STATES PATENT OFFICE.

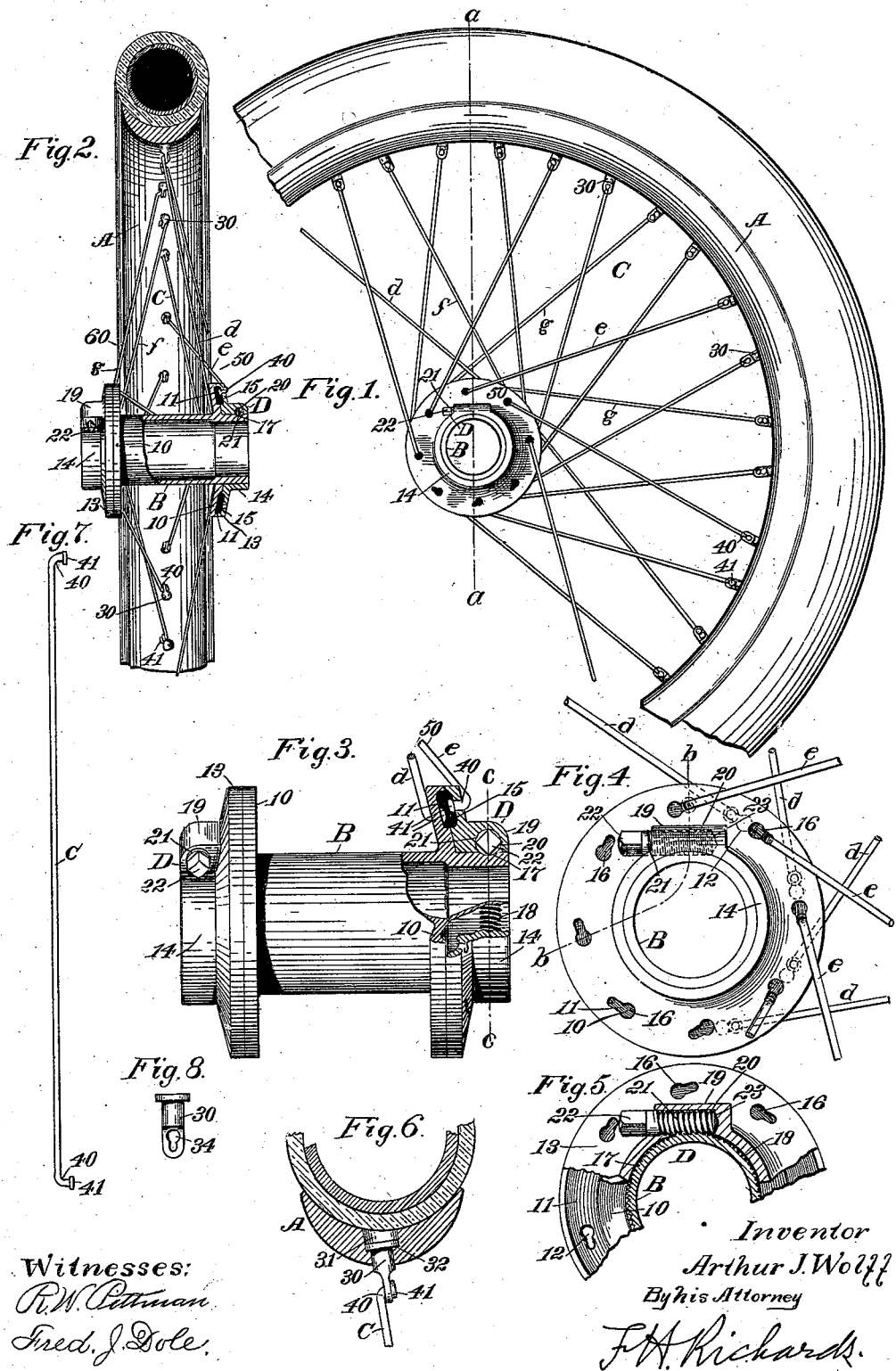

ARTHUR J. WOLFF, OF HARTFORD, CONNECTICUT.

VEHICLE-WHEEL.

SPECIFICATION forming part of Letters Patent No. 556,125, dated March 10, 1896.

Application filed December 12, 1895. Serial No. 571,861. (No model.)

*To all whom it may concern:*

Be it known that I, ARTHUR J. WOLFF, a citizen of the United States, residing at Hartford, in the county of Hartford and State of Connecticut, have invented certain new and useful Improvements in Vehicle-Wheels, of which the following is a specification.

This invention relates to vehicle-wheels, but more especially, however, to that class of wheels known in the art as "bicycle" and "tricycle" wheels, and is especially adapted for use in bicycles and tricycles and other light vehicles; and the object of the invention is to provide an improved wheel in which the spokes thereof may be normally freely removable therefrom and in which series of spokes may be adjusted simultaneously to regulate the tension thereof.

A further object of this invention is to provide means for holding the spokes in tangential position relatively to the hub and for regulating the tension of series of said spokes while in such tangential position.

In the drawings acompanying and forming part of this specification, Figure 1 is a side elevation of a portion of a wheel constructed substantially in accordance with my invention herein described. Fig. 2 is a diametrical partly-sectional view taken in line *a a*, Fig. 1. Fig. 3 is an elevation of the hub detached and partly in section, and shows the preferred means of securing the spokes thereto and adjusting the tension of the same, the sectional portion thereof being approximately taken in line *b b*, Fig. 4. Fig. 4 is an end view of the hub, showing some of the spokes secured thereto. Fig. 5 is a cross-sectional view of a portion of the hub, taken in line *c c*, Fig. 3. Fig. 6 is a cross-sectional view of the felly and a portion of the tire, and shows in connection therewith one form of means for securing the outer ends of the spokes to said felly. Fig. 7 is a view of one form of spoke detached, and Fig. 8 is a detail view of one form of means for securing the spokes to the felly.

Similar characters designate like parts in all the figures of the drawings.

My improved wheel, in the preferred form thereof herein shown and described, consists, in a general way, of a rim or felly, (designated generally by A,) a hub, (designated in a general way by B,) a series of spokes, (designated in a general way by C,) and suitable means (designated in a general way by D) for regulating the tension of the spokes, and which means may also embody suitable means for holding the inner ends of a series of spokes adjacent to the hub.

The hub of the wheel may be of any suitable and well-known construction, so far as concerns that portion which is supported on the axle or shaft, and in practice will usually be provided with suitable ball or other anti-friction bearings, said hub being constructed in any suitable form or shape to adapt it for use with the same, but, as said bearings do not constitute an essential part of my invention, it is not deemed necessary to illustrate the same.

The hub B, in its preferred construction shown, has an annular spoke-flange or member 10 fixed near each end thereof, which spoke-flanges are preferably shown inclined slightly toward each other and toward the felly of the wheel. Each spoke-flange has in its outer face an annular recess or groove 11, for the purpose hereinafter set forth, and also has extending around the same and opening into this annular recess or groove 11 a series of openings 12, each opening preferably having differential diameters and shown of keyhole or buttonhole form, said openings all being slightly inclined in one direction toward the flange-periphery, whereby they are substantially tangentially disposed relatively to the hub.

Removably and rotatably secured on each outer end of the hub adjacent to each fixed flange 10 is a second annular spoke-flange or member 13, (shown inclined in the same direction as the fixed flange and toward the felly of the wheel,) and preferably embodying a hub portion 14, encircling the outer end of the main hub. Each rotatable flange 13 has an annular recess or groove 15 in its inner face opposite to the annular recess or groove 11 of its companion fixed flange 10, and also has similar spoke-receiving openings 16 for the attachment of the inner ends of a series of spokes, in a manner hereinafter set forth, and which openings are likewise slightly inclined toward the periphery of their flange, but in a direction opposite to the direction of inclination of the openings 12 of the fixed flange, and whereby they are substantially tangentially disposed relatively to the hub.

Each fixed flange or member, together with its companion rotatable flange or member practically forms one spoke-carrying flange at each end of the hub, having operatively connected therewith suitable means for regulating the tension of one set of spokes independently of the other set of spokes carried by the other flange at the opposite end of the hub, in a manner hereinafter set forth.

According to one form of means for rotatably adjusting each movable flange 13 relatively to its companion or fixed flange 11 the main hub is shown having on its exterior between each end thereof and each fixed flange 10 a shallow groove 17, having teeth in the nature of worm-teeth 18, and preferably extending around the same. Each rotatable flange 13 is constructed to receive an actuating device, and in the form shown the hub 14 of each flange 13 is provided with an enlarged portion 19, having a smooth bored socket 20, opening into the shallow recess 17, having the worm-teeth 18. Rotatable within this socket 20 is a suitable actuating device, (shown herein in the nature of a screw 21, having its threads in engagement with the worm-teeth 18 and preferably having a squared head 22,) whereby the same can be actuated. This screw preferably has its bearing at its inner end against the end wall 23 of the socket 20 rather than adjacent to its outer end, whereby the squared head 22 thereof can be made substantially of the same diameter as the screw-threaded portion thereof, and thus prevent any interference with the actuation of said screw by the rotatable flange, as would be the case if the screw was provided with an enlarged bearing flange or head engaging the outer end of the enlarged portion 19. By means of this adjusting-screw 21 and the worm-teeth 18, formed in the shallow recess 17, the rotatable flange is held on the main hub against longitudinal displacement or movement in a manner that will be obvious without further description. If desired, however, the ends of the main hub might be extended beyond the outer edges of the rotatable flanges and suitable locking devices, such as adjustable nuts, placed thereon for affording an additional holding means for said flanges.

It will be understood that my invention is not necessarily limited to an actuating-screw and worm for adjusting one flange relatively to the other flange, as each flange might have a suitable wedge-shaped portion thereon, which, together with a locking device, such as a nut carried on the outer end of the main hub, would effect substantially the same result, as on the adjustment of said nut the wedge-shaped portion of the adjustable flange would be caused to engage the wedge-shaped portion of the fixed flange and be moved relatively thereto, in a manner that will be obvious without a more explicit description and without the necessity of illustrating the same. It will also be understood that the adjustable flanges, according to either construction of means for actuating the same, need not be disposed on the outer end of the hub, but may be disposed on the tubular portion of the hub intermediate of the fixed flanges 10, if desired, and that the flanges 10 and 13 need not necessarily be inclined toward the felly, but may be straight or otherwise disposed. In one construction of the hub, in connection with means for adjusting the flanges relatively to each other by the use of wedges when said adjustable flanges are disposed intermediate of the fixed flanges, the hub could be transversely divided to permit the reception of locking-nuts and a sleeve for holding the hub members together.

The means for securing the outer ends of the spokes to the felly, in the construction of wheel shown, consists, in the preferred form thereof, of a series of connectors, (shown herein in the form of headed studs or pins 30, seated in recesses 31 of the felly and removable therefrom, if desired, when the tire is removed.) Each of these recesses 31 is preferably of two diameters, whereby the heads of the connectors will rest on the juncture walls 32 thereof, and the lower ends of said connectors project through that portion of the recess having the smallest diameter, and in position to have the outer ends of the spokes secured thereto. These recesses are shown inclined toward one or the other of the hub-flanges and preferably in alternation. The projecting end of each connector has an opening 34, which is herein shown of two diameters substantially in the form of a buttonhole or keyhole.

The spokes C, in the preferred form thereof herein shown and described, are of the same length, and are provided with bent ends 40 and enlarged heads 41, and when the wheel is assembled are shown disposed in two sets 50 and 60, one set connected adjacent to one end of the hub and the other set connected adjacent to the other end of the hub, and each set of which is shown consisting of two tangentially and oppositely disposed series; and one of said sets of spokes, as 50, has one of its series, as d, secured to one fixed flange 10 and its other series, as e, secured to its companion adjustable flange 13, and the other of said sets of spokes, as 60, has one of its series, as f, secured to the opposite fixed flange 10 and its other series, as g, secured to the other adjustable flange 13.

In assembling the wheel each spoke of the series d of the set—as 50, for instance—has its inner end inserted through the larger portion of one of the openings 12 of a fixed flange 10 and drawn into the narrower portion thereof, and each spoke of the series e of said set 50 has its inner end inserted through the larger portion of one of the openings 16 of the companion adjustable flange 13 and drawn into the narrower portion thereof, whereby the two series of the set will be oppositely disposed relatively to each other and will have the heads thereof within the annular grooves or recesses 11 and 15, respectively, of the flanges 10 and 13, and whereby also the two series of the set of spokes, owing to the inclination of the openings 12 and 16, will be tangentially disposed relatively to the hub, and each series of spokes of the same set extending in opposite directions—that is to say, all the spokes of the series $e$ of the set 50, for instance, will extend in one direction toward the felly, while all the spokes of the series $d$ of the same set will extend in the opposite direction toward said felly. The outer ends of the spokes are then inserted in the openings of their respective connectors in position to be drawn into the narrower portions thereof. One of the actuating-screws is then turned, whereby its rotatable flange 13 and its fixed flange 10 at one end of the hub are adjusted relatively to each other and moved in opposite directions and the outer ends of the spokes all simultaneously drawn into the narrower portions of the connectors and firmly held therein by the adjustment of the hub-flanges and the tension of all the spokes of the set simultaneously adjusted, and whereby, on the adjustment of the other set of spokes in the same manner, all the spokes will be held firmly in their tangential position and the felly and its tire will be properly centered and trued without the necessity of independently adjusting each spoke, as heretofore. On reversing the movements of the actuating-screws the tension of the spokes is released, and one or more defective or broken spoke or spokes can be quickly and easily removed and replaced by one or more perfect ones. By means of this adjusting device the wheel can be properly trued at all times by the user and kept in such condition without the necessity of having the wheel sent to the repair-shop for this purpose when the tire commences to wabble, as is now ordinarily done.

Having thus described my invention, I claim—

1. In a wheel, a hub having a fixed flange and a rotatable flange; said hub having worm-teeth, and said rotatable flange carrying an actuating-screw in mesh with said worm-teeth, whereby said flanges are rotatable relatively to each other.

2. In a wheel, a hub having a fixed flange, and having an annular groove having worm-teeth therein; a rotatable flange on said hub, and an actuating-screw in operative engagement with said flange and with said worm-teeth, for actuating said rotatable flange, whereby said flanges will be rotatable in opposite directions relatively to each other.

3. In a wheel, a hub having a fixed flange, and having an annular groove having worm-teeth therein; a rotatable flange on said hub having an enlarged socketed portion opening into said groove; an actuating-screw rotatable in said socket and in engagement with said worm-teeth, and adapted to actuate said rotatable flange, whereby said flanges will be rotatable in opposite directions relatively to each other.

4. In a wheel, a hub having a fixed flange having an annular groove having worm-teeth therein; a removable and rotatable flange on said hub; an actuating-screw carried by said flange and in engagement with said worm-teeth in the groove, for holding said removable flange against longitudinal displacement or movement, and for actuating said rotatable flange, whereby said flanges will be rotatable in opposite directions.

5. In a wheel, the combination of a felly; a hub having a fixed flange near each end thereof; a removable flange rotatably secured adjacent to each fixed flange; two sets of spokes secured at their outer ends to the felly, and each set thereof consisting of two series; one series of one set having their inner ends connected to the fixed flange at one end of the hub, and the other series of the same set having their inner ends connected to the rotatable flange adjacent to said fixed flange; and one series of the other set of spokes having their inner ends connected to the opposite fixed flange, and the other series thereof having their inner ends connected to its companion rotatable flange; and means for actuating said rotatable flanges, whereby said fixed flanges and said rotatable flanges will be rotated in opposite directions relatively to each other, for regulating the tension of said spokes, and the felly thereby properly centered.

6. A wheel having a felly, a hub having a flange adjacent to each end thereof, each of said flanges comprising separable members, one of the separable members of each flange being rotatable relatively to its other member; two sets of spokes having their outer ends connected to the felly, and each set consisting of two series; one series of one set having their inner ends secured to one member of a flange, and the other series of the same set of spokes having their inner ends secured to the other member of the same flange; and one series of the other set of spokes having their inner ends secured to one member of the opposite flange, and the other series of the same set having their inner ends secured to the other member of said opposite flange; and means in operative connection with each of said flanges, for actuating the rotatable members thereof to rotate the member of each flange in opposite directions relatively to each other, whereby the spokes will be held in tangential positions relatively to the hub, and the tension of all the spokes of each set regulated simultaneously, and independently of the other set.

7. In a wheel, the combination of a felly having a series of connectors secured thereto; a hub having a fixed flange adjacent to each end thereof, each of said flanges having an annular groove or recess on its outer face, and also having a series of openings of differential diameters opening into said annular recesses or grooves; said hub also having adjacent to each fixed flange a groove having worm-teeth therein; a removable flange rotatably secured on each end of the hub, and having an annular recess or groove on its inner face opposite to the annular recess or groove of the fixed flange, and also having a series of openings of differential diameters opening into said recess or groove; an actuating-screw carried by each of said rotatable flanges and meshing with the worm-teeth of the hub, whereby on the actuation of said screw each rotatable and fixed flange will be moved in a direction opposite to each other; and two sets of spokes having their outer ends connected to the connectors of the felly, and each set consisting of two series, the inner ends of one series of one set engaging in the openings of one fixed flange, and the inner ends of the other series of the same set engaging in the openings of the companion rotatable flange; and the inner ends of one series of the other set engaging in the openings of the other fixed flange at the opposite end of the hub, and the inner ends of the other series of the same set engaging in the openings of the rotatable companion flange at said opposite end of the hub, whereby on the actuation of one of said rotatable flanges both series of one set of spokes will be simultaneously adjusted to regulate the tension thereof independently of the other set of spokes.

8. In a wheel, the combination of a felly; a hub having a fixed flange having an annular recess or groove, and having a series of slots opening into said recess or groove; a flange rotatably secured on said hub, and also having an annular recess or groove opposite to the recess or groove of the fixed flange, and also having slots opening into said recess or groove; a set of tangentially-disposed spokes having their outer ends secured to the felly, and consisting of two series, the inner ends of one series engaging in the slots of the fixed flanges, and the inner ends of the other series engaging in the slots of the rotatable flange; and means for actuating said rotatable flange, whereby said flanges will be moved in opposite directions relatively to each other for regulating the tension of the spokes.

9. In a wheel, the combination of a felly, a hub having a fixed flange having an annular recess or groove, and having a series of openings having differential diameters opening into said recess or groove; a flange rotatably secured on said hub, and also having an annular recess or groove opposite to the recess or groove of the fixed flange, and having openings of differential diameters and opening into said recess or groove; a set of reversible and tangentially-disposed removable spokes having enlarged heads at each end thereof, and having their outer ends secured to the felly, and consisting of two series, the inner ends of one series engaging in the openings of the fixed flange, and the inner ends of the other series engaging in the openings of the rotatable flange; and means for actuating said rotatable flanges, whereby said flanges will be moved in opposite directions relatively to each other for regulating the tension of the spokes.

10. In a wheel, the combination of a felly; a hub having a fixed flange having an annular recess or groove, and having a series of slots opening into said recess or groove, said hub also having worm-teeth on its periphery; a flange rotatably secured on said hub, and also having an annular recess opposite to the recess or groove of the fixed flange, and having slots opening into said recess or groove; a set of tangentially-disposed spokes having their outer ends secured to the felly, and consisting of two series, the inner ends of one series engaging in the slots of the fixed flange; and the inner ends of the other series engaging in the slots of the rotatable flange; and an actuating-screw carried by said rotatable flange and meshing with the worm-teeth of the hub, for rotating said flange and thereby moving said flanges in opposite directions relatively to each other for regulating the tension of the spokes.

11. In a wheel, the combination of a felly; a hub having a fixed flange having an annular recess or groove having a series of slots opening into said recess or groove, said hub having a groove on its periphery, and having worm-teeth therein; a flange rotatably secured on said hub, and also having an annular recess or groove opposite to the recess or groove of the fixed flange, and having slots opening into said recess or groove; a set of tangentially-disposed spokes having their outer ends secured to the felly, and consisting of two series, the inner ends of one series engaging in the slots of the fixed flange, and the inner ends of the other series engaging in the slots of the rotatable flange; an actuating-screw carried by said rotatable flange and meshing with the teeth in the groove, and constituting a means for holding said rotatable flange against longitudinal displacement or movement; and also means for actuating said rotatable flange, whereby said flanges will be moved in opposite directions relatively to each other for regulating the tension of the spokes.

12. In a wheel, the combination of a felly; a hub having a fixed flange having an annular recess or groove, and having a series of slots opening into said recess or groove, and inclined in one direction toward the periphery of said flange; a flange rotatably secured on said hub, and also having an annular recess or groove opposite to the recess or groove of the fixed flange, and having slots opening into said recess or groove, and inclined in an opposite direction toward the periphery of said flange; a set of tangentially-disposed spokes having their outer ends secured to the felly, and consisting of two series, the inner ends of one series engaging in the openings of the fixed flange and inclined in one direction toward the felly, and the inner ends of the other series engaging in the openings of the rotatable flange and inclined in the opposite direction toward the felly; and means for actuating said rotatable flange, whereby said flanges will be moved in opposite directions relatively to each other for regulating the tension of the spokes.

13. In a wheel, the combination of a felly, a hub having a fixed flange having an annular recess or groove, and having a series of slots opening into said recess or groove, and inclined in one direction toward the felly, said hub having worm-teeth on its periphery; a flange rotatably and removably secured onto said hub, and also having an annular recess or groove opposite to the recess or groove of the fixed flange, and having slots opening into said recess or groove and inclined in a direction opposite to the direction of inclination of the fixed-flange slots; a set of tangentially-disposed spokes having their outer ends secured to the felly, and consisting of two series, the inner ends of one series engaging in the slots of the fixed flange, and the inner ends of the other series engaging in the slots of the other flange; and an actuating-screw carried by said rotatable flange and meshing with the worm-teeth on the periphery of the hub and constituting a means for holding said removable flange against displacement or movement, and for actuating said rotatable flange, whereby said flanges will be moved in opposite directions relatively to each other for regulating the tension of the spokes.

14. In a wheel, the combination of a felly; a hub having a fixed flange having a series of openings inclined in one direction toward the periphery thereof, and said hub also having worm-teeth on its periphery; a rotatable flange on said hub also having a series of openings inclined in an opposite direction toward the periphery thereof; a set of tangentially-disposed spokes having their outer ends connected to the felly, and consisting of two series, the inner ends of one series engaging in the openings of the fixed flange, and the inner ends of the other series engaging in the openings of the rotatable flange, whereby one series of spokes will be inclined in a direction toward the felly opposite to the direction of inclination of the other series thereof; and an actuating-screw carried by said rotatable flange and meshing with said worm-teeth, for rotating said flange, whereby said flanges will be moved in opposite directions relatively to each other for regulating the tension of the spokes.

15. In a wheel, the combination of a felly, a hub having a fixed flange having a series of openings inclined in one direction toward the periphery thereof, said hub also having an annular groove on its periphery having worm-teeth therein; a rotatable flange on said hub also having a series of openings inclined in an opposite direction toward the periphery thereof; a set of tangentially-disposed spokes having their outer ends connected to the felly, and consisting of two series, the inner ends of one series engaging in the openings of the fixed flange, and the inner ends of the other series engaging in the openings of the rotatable flange, whereby one series of spokes will be inclined in a direction toward the felly opposite to the direction of inclination of the other series thereof; and an actuating-screw in operative engagement with said rotatable flange, and with said worm-teeth, and constituting a means in connection with said peripheral groove for holding said rotatable flange onto said hub against displacement or movement, and for actuating said rotatable flange, whereby said flanges will be moved in opposite directions relatively to each other for regulating the tension of the spokes.

ARTHUR J. WOLFF.

Witnesses:
 FRED. J. DOLE,
 HENRY BISSELL.